Sept. 13, 1927.     N. F. VANDERLIPP     1,642,278

FASTENER

Filed Nov. 5, 1925

INVENTOR.
NATHAN F. VANDERLIPP
BY Stockbridge & Borst
ATTORNEYS.

Patented Sept. 13, 1927.

1,642,278

UNITED STATES PATENT OFFICE.

NATHAN F. VANDERLIPP, OF BLOOMFIELD, NEW JERSEY, ASSIGNOR TO WRIGHT AERONAUTICAL CORPORATION, A CORPORATION OF NEW YORK.

FASTENER.

Application filed November 5, 1925. Serial No. 66,944.

This invention relates to composite structures and particularly to a manner of fastening together a plurality of objects, such as, for example, one or more sheets of material to a structure or other sheet. Such a structure, for example, is advantageous in securing the cowling of airplanes in position and will be described in connection therewith, although it will be understood that the invention is not necessarily limited to such a specific use.

An object of the invention is to provide an improved composite structure by which two parts or objects may be readily connected together or disengaged from one another without the use of tools, and without the employment of any loose connecting pieces which might become easily lost under ordinary operating conditions; which permits of a rapid connection or disconnection of said parts; which will afford a strong and durable connection between two members; with which the danger of accidental or unintentional disconnection of the members is reduced to a minimum; and which will be relatively simple, convenient and inexpensive.

Various other objects and advantages will be apparent from the following description of several embodiments of the invention, and the novel features will be particularly pointed out hereinafter in connection with the appended claims.

In the accompanying drawing:—

Figure 1:
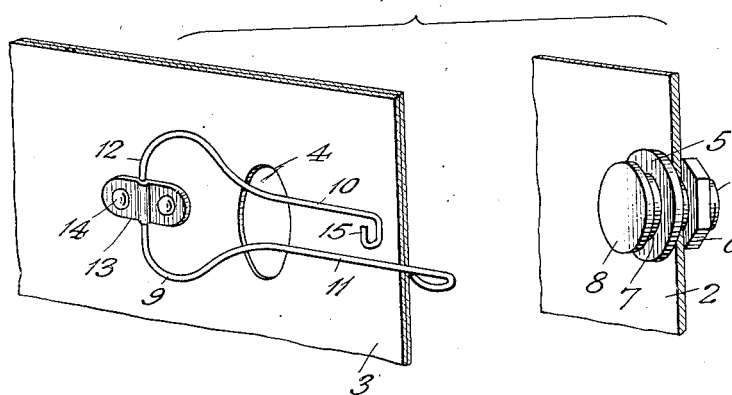
Fig. 1 is a perspective of two members to be connected to form the composite structure, said members being shown separated from one another but positioned to be connected.
Figure 2:
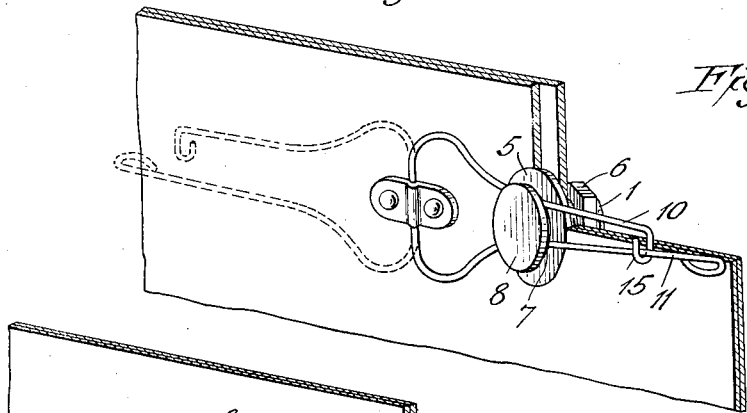
Fig. 2 is a similar perspective with the members connected together in accordance with the invention.

Referring particularly to Figs. 1 and 2, a stud 1, such as a bolt, is secured to one of the members 2 which is to be connected to a member 3. The member 3, in the particular example, illustrates a portion of the cowling of an airplane and is formed of sheet material, such as sheet metal. The member 3 is provided with an aperture 4 for receiving the projecting end of the stud 1, and through which the stud 1 projects to some extent. The stud 1, in the particular example, is in the nature of a bolt having intermediate of its ends a collar or peripheral flange 5 which abuts against one face of the member 2.

A nut 6 may be threaded upon the stud and against the other face of the member 2 to clamp the stud firmly to the member 2 with the headed end of the bolt projecting from the face of the member 2. The space 7 between the head 8 of the stud and the peripheral flange or collar 5 is in effect an undercut in the bolt which is utilized in a manner to be explained presently. The thickness of the flange or collar 5 is substantially the thickness of the member 3 which is passed thereover, and has a diameter substantially that of the aperture 4 of the member 3, so as to substantially fill the aperture 4 when inserted therein in the manner shown in Fig. 2.

A stretch of resilient wire 9 is doubled upon itself into a somewhat U-shaped form, so as to provide resilient arms 10 and 11 which are connected by a short base portion or stretch 12. The short base portion 12 is secured against a face of the member 3 in a suitable manner such as by a bearing or hinge strap 13, which fits over the base portion 12 and abuts against the member 3, being secured to the latter in a suitable manner, such as by rivets 14. The strap may have a slight, partially cylindrical concavity or transverse groove fitting over the short base portion 12, so that the strap will lie flat against the face of the member 3 with the base portion 12 within the transverse groove.

The arms 10 and 11 normally extend across the aperture 4, as shown at the left in Fig. 1, and may be swung about the hinged connection formed by the strap 13 into the dotted line position shown in Fig. 2, so to entirely uncover the aperture 4. When the projecting or headed end of the stud is inserted through the aperture 4, the undercut portion 7 will lie immediately in front of the face of the member 3 through and from which the headed end of the stud projects. The stretch of wire may then be swung about its hinge across the head of the stud, the arms 10 and 11 sprung laterally to clear the head and then released, whereupon they will snap into the undercut portion 7 beneath the head 8 of the stud and lock the stud against removal or withdrawal from the aperture.

It will be understood that the arms 10 and 11 could be sprung apart from over the aperture 4 while the stud was being inserted through the aperture without being swung into the dotted position, but in many cases, it is desirable to swing the wire latch into the dotted position of Fig. 2 in order that the stud may be inserted without hindrance from the latch. The latter is particularly desirable when there are several of such fastening devices for a large member 3, and where individual attention at each stud during the assembly is impractical.

In order to prevent accidental or unintentional disengagement of the resilient arms 10 and 11 from the undercut of the stud, one of the arms, such as 10, may have its free end bent into the form of a hook 15 with which the other arm 11 may be engaged by a springing together of the free projecting ends of the two arms 10 and 11, as shown in Fig. 2. The engagement with one another of said arms 10 and 11 will effectively prevent their accidental or unintentional disengagement from the stud, and therefore a very effective and reliable connection is established between the two connected members.

Figure 3:
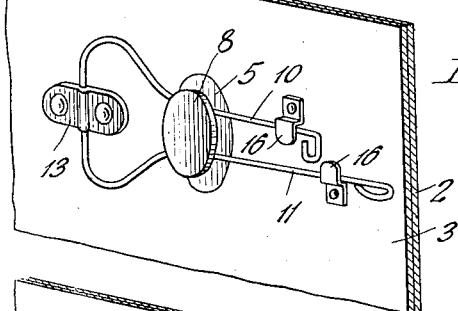
Fig. 3 is a somewhat similar perspective of two members connected in accordance with the invention, but illustrating another embodiment thereof.

Referring to Fig. 3, the construction is the same as in Figs. 1 and 2 except that individual hooks 16 may be secured to or provided upon the face of the member 3 through and from which the headed end of the bolt projects, so that the arms 10 and 11 of the wire latch may be individually hooked or latched in locked position across the aperture and in the undercut 7 to prevent unintentional or accidental release of the stud.

Figure 4:
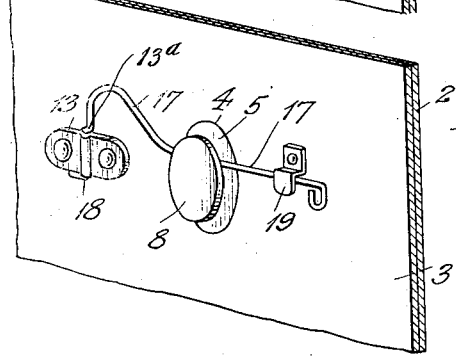
Fig. 4 is a similar perspective of still another embodiment of the invention.

In Fig. 4 a similar but somewhat simpler construction is illustrated, in which the latch consists of a single stretch 17 of wire having an offset portion 18 at one end hingedly secured to a face of the member 3 by a strap 13 as in the preceding embodiments, the portion of the wire at each end of the section covered by the strap being offset or made slightly angular to prevent its endwise movement in the groove of the strap. The wire 17 may be swung into a position across the aperture 4 so as to be snapped over the head 8 of the stud and into the undercut 7 thereof as in the preceding embodiment. The free end of the wire 17 may be hooked beneath a tongue or hook 19 similar to the hook 16 of Fig. 3, so that it cannot be accidentally moved from across the aperture 4.

Figure 5:
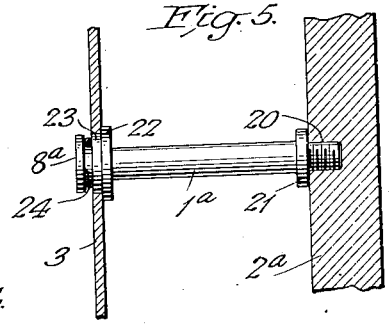
Fig. 5 is a sectional elevation through two members also connected in accordance with the invention, and illustrating still another embodiment thereof.

In all of the preceding embodiments, it has been desirable to secure the two members 2 and 3 together face to face, but in some instances, it will be desirable or necessary to anchor them together in spaced relation to one another. In Fig. 5 an application of the invention to such conditions is illustrated. In this particular instance a member 2$^a$, corresponding to the member 2, is provided with an aperture or recess 20 into which one end of a stud 1$^a$ is threaded, the stud having a shoulder or flange 21 limiting the extent to which the stud may be threaded into the member 2$^a$. At the desired spaced distance from the member 2$^a$, the stud may be provided with a flange 22 against which the member 3 may be secured, the same as in the preceding embodiments.

The portion of the stud immediately in front of the flange 22 is provided with a portion 23 of reduced diameter and of a size approximately equal to the size of the aperture 4, so that when the member 3 is placed over the end of the stud, it will be received upon the portion 23 which corresponds to the flange 5 of the preceding embodiments. In front of the portion 23, the stud has an annular groove 24 serving as the undercut beneath the head 8$^a$ of the stud.

The head 8$^a$ must not be larger than the portion 23 which fills the aperture 4, otherwise it cannot be passed through the aperture during a connection together of the members. Any of the latch devices shown in the other figures may be employed to engage in the undercut 24 and prevent withdrawal of the stud from the member 3, and such latch devices may be interhooked with one another as in Figs. 1 and 2, or engaged with hooks upon the member 3 as in Figs. 3 and 4, in order to prevent accidental or unintentional release of the stud.

In order to effect a connection between the two members, the members are brought together, with the stud of the member 2 or 2$^a$ projecting through the aperture 4 of the member 3, and the latch device engaged in the undercut. The arms of the latch device, it will be observed, are normally biased to extend across the aperture, so that when released they will tend to snap into the undercut 7 or 24 of the stud and thereby lock the latter against withdrawal from the member 3. Preferably only the head and undercut portion of each stud will project beyond the member 3. In order to separate the members, it is only necessary to disengage the latch from the bolt by springing the arm or arms away from the stud, laterally, so as to clear the undercut, whereupon the stud will be released and may be withdrawn from the aperture 4. It will be understood, however, that the arms of the latch must be disengaged from one another or from the hooks 22 before being flexed out of the undercut of the stud.

It will also be understood that several sheets of material 3 may be secured directly to the base or structure 2, it being merely necessary to provide the flange or collar 5 of a thickness corresponding to the combined thickness of the members to be secured to the member 2. Inasmuch as the latch device is permanently connected to the member 3, it can never become lost or misplaced, and will always be in proper position to engage with the stud when an assembly is to be made. The assembly or connection together of the two members may be accomplished rapidly and easily without the use of any special tools, and without special skill on the part of the workmen.

It will be understood that instead of a circular undercut groove in the stud, one or more milled slots may be utilized as the undercut. It will also be understood that the stud is not necessarily of circular cross section, but may be of any form which may be desired. Each stud may also be secured to the member 2 or 2ª in any other suitable manner, instead of in the manner illustrated, and the members to be secured are not necessarily flat members. In all of the embodiments of the invention, the short stretch of the latch wire connecting the spring arm could have slight offsets therein at the ends of the bearing in the strap 13, as shown at 13ª in Fig. 4, so that the latch device could not slide in the bearing under the strap out of proper latching position.

It will be obvious that various other changes in the details, which have been herein described and illustrated for the purpose of explaining the nature of the invention, may be made by those skilled in the art within the principle and scope of the invention as expressed in the appended claims.

I claim:—

1. A composite structure comprising two members to be connected, a stud carried by and projecting from one of said members, the other of said members having an aperture through which the stud projects, a latch comprising a stretch of wire doubled upon itself to form two free arms connected by a short base portion, and a strap secured to the apertured member and hingedly confining the base portion of said wire thereto with the arms of the wire extending across the aperture, whereby the wire may be swung about its hinged connection to the apertured member into positions to cover or uncover said aperture, the projecting end of said stud being undercut, whereby when projecting through said aperture the arms of said wire may be sprung laterally to clear the head and snap into said undercut and lock the stud against withdrawal from the aperture.

2. A composite structure comprising two members to be connected, a stud carried by and projecting from one of said members, the other of said members having an aperture through which the stud projects, a latch comprising a stretch of wire doubled upon itself to form two free arms connected by a short base portion, and a strap secured to the apertured member and hingedly confining the base portion of said wire thereto, with the arms of the wire extending across the aperture, whereby the wire may be swung about its hinged connection to the apertured member into positions to cover or uncover said aperture, the projecting end of said stud being undercut whereby when it is projecting through said aperture, the arms of said wire may be sprung laterally thereof to clear the head, snap into said undercut, and lock the stud against withdrawal from the aperture, one of said arms being bent to form a hook with which the other of said arms may be engaged to latch them together in said undercut.

3. A composite structure comprising two members to be connected, a stud carried by and projecting from one of said members, the other of said members having an aperture through which the stud projects, the projecting end of the stud having an undercut, a stretch of resilient wire bent upon itself to form two arms connected by a short base portion, and means for securing said short base portion to the apertured member with the arms of the wire extending across said aperture, whereby said arms may be flexed laterally from across said opening to permit of the insertion of the stud and snap into said undercut when released, and thereby lock the stud against removal, one of said arms being bent to form a hook with which the other arm may be engaged in order to prevent disengagement of the arms from the undercut.

In witness whereof, I hereunto subscribe my signature.

NATHAN F. VANDERLIPP.